United States Patent
Srinivasaraghavan et al.

(10) Patent No.: US 11,636,102 B2
(45) Date of Patent: Apr. 25, 2023

(54) NATURAL LANGUAGE-BASED CONTENT SYSTEM WITH CORRECTIVE FEEDBACK AND TRAINING

(71) Applicant: Verizon Patent and Licensing Inc., Arlington, VA (US)

(72) Inventors: Haripriya Srinivasaraghavan, Plano, TX (US); Praveen Kumar Bandaru, Irving, TX (US); Veena Chugani, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 895 days.

(21) Appl. No.: 16/561,567

(22) Filed: Sep. 5, 2019

(65) Prior Publication Data

US 2021/0073215 A1  Mar. 11, 2021

(51) Int. Cl.
*G06F 3/048* (2013.01)
*G06F 16/242* (2019.01)
*G06F 16/248* (2019.01)
*G06F 16/2457* (2019.01)
*G06N 7/00* (2023.01)
*G06N 20/00* (2019.01)

(52) U.S. Cl.
CPC .......... *G06F 16/243* (2019.01); *G06F 16/248* (2019.01); *G06F 16/24578* (2019.01); *G06N 7/005* (2013.01); *G06N 20/00* (2019.01)

(58) Field of Classification Search
CPC ............. G06F 16/243; G06F 16/24578; G06F 16/248; G06N 20/00; G06N 7/005
See application file for complete search history.

(56) References Cited

U.S. PATENT DOCUMENTS

| | | | | |
|---|---|---|---|---|
| 8,589,429 B1* | 11/2013 | Thirumalai | ......... | G06F 16/2228 707/766 |
| 8,983,996 B2* | 3/2015 | Lai | ....... | G06F 16/9032 707/767 |
| 9,275,147 B2* | 3/2016 | Meschkat | ............. | G06F 16/951 |
| 9,298,828 B1* | 3/2016 | Das | ....... | G06F 16/951 |
| 9,477,782 B2* | 10/2016 | Marantz | ............. | G06F 16/2423 |
| 9,569,545 B2* | 2/2017 | Newey | ............... | G06F 16/9535 |
| 10,108,720 B2* | 10/2018 | Chen | ................... | G06F 16/9535 |
| 2006/0161520 A1* | 7/2006 | Brewer | ............... | G06F 16/3322 |
| 2010/0153112 A1* | 6/2010 | Phillips | ............... | G06F 16/3325 704/E15.001 |
| 2010/0153384 A1* | 6/2010 | Van Zwol | ........... | G06F 16/2425 707/726 |
| 2015/0269221 A1* | 9/2015 | Raz | ..................... | G06F 16/2425 707/706 |

(Continued)

*Primary Examiner* — Rashawn N Tillery

(57) ABSTRACT

A method, a device, and a non-transitory storage medium are described, which provide a natural language-based content system with corrective feedback and training service. The natural language-based content system with corrective feedback and training service may collect data based on interaction with search results from users. The natural language understanding model may generate feedback data based on the collected data, and use the feedback data to further train the natural language understanding model and update search and discovery logic for searching and discovering contents. The feedback data may categorize errors based on the interaction, and identify differences between search queries received during a search session with a user.

20 Claims, 9 Drawing Sheets

(56) References Cited

U.S. PATENT DOCUMENTS

| | | | | |
|---|---|---|---|---|
| 2015/0324434 A1* | 11/2015 | Greenwood | ............ | G06F 16/00 |
| | | | | 707/722 |
| 2017/0147569 A1* | 5/2017 | Mizobuchi | ............ | G06F 16/148 |
| 2017/0308552 A1* | 10/2017 | Soni | ........................ | G06F 16/54 |
| 2021/0073215 A1* | 3/2021 | Srinivasaraghavan | ...................... | |
| | | | | G06F 16/2425 |

\* cited by examiner

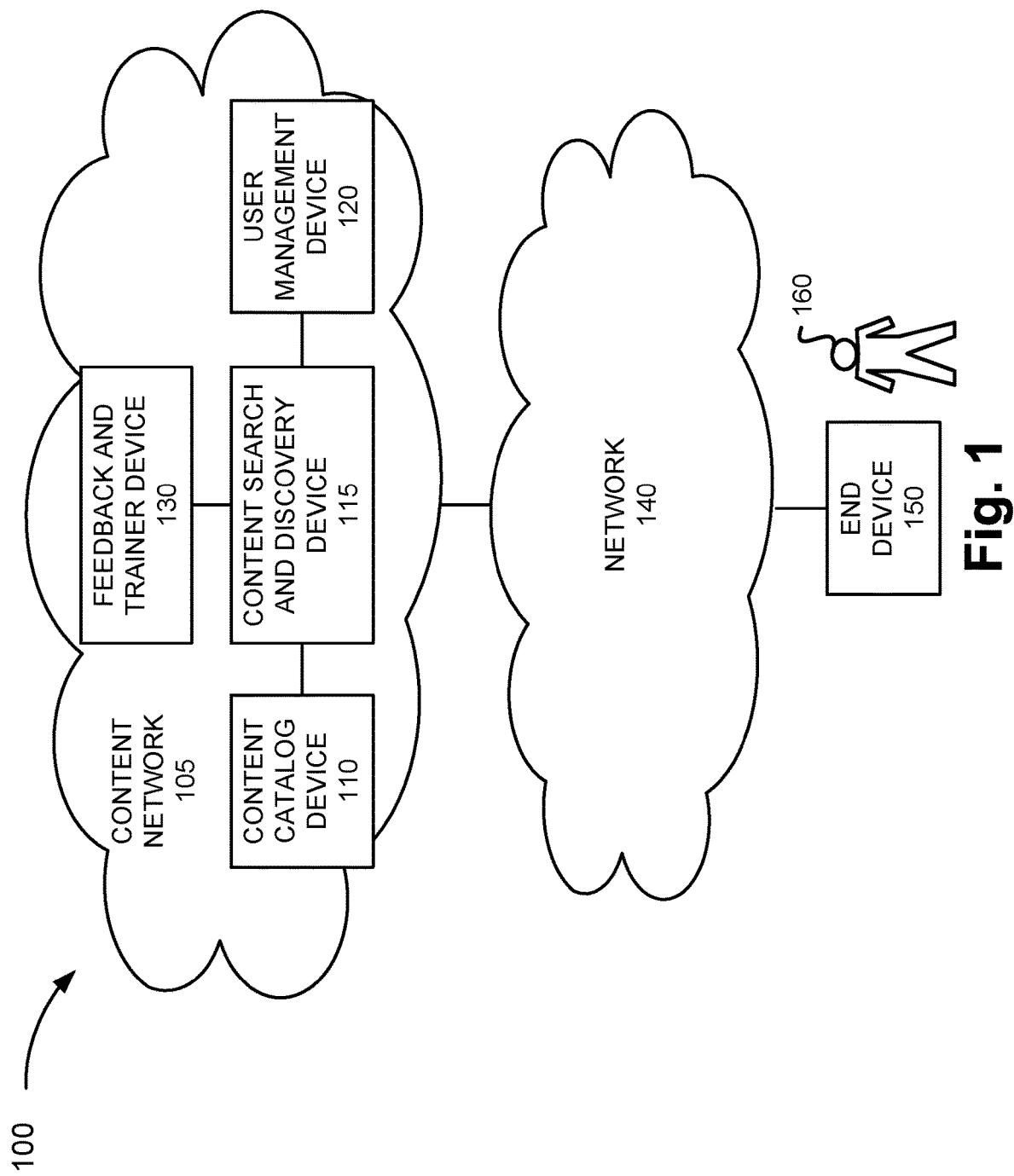

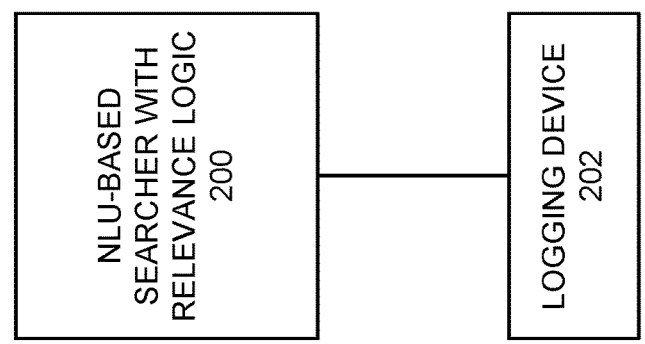

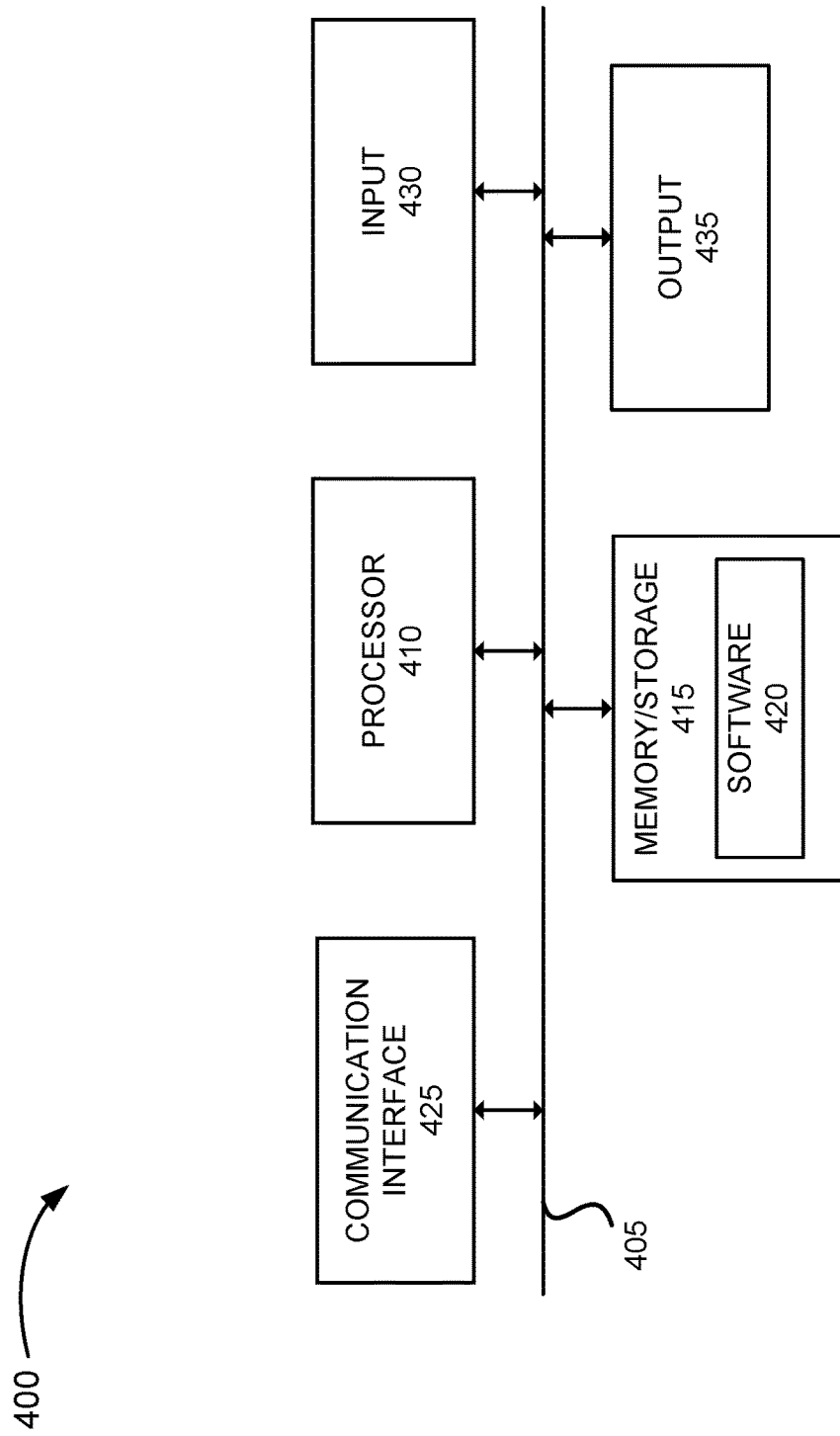

NATURAL LANGUAGE-BASED CONTENT SYSTEM WITH CORRECTIVE FEEDBACK AND TRAINING

BACKGROUND

Content networks use various network devices to manage content (e.g., movies, television programs, on-demand programming, etc.) and corresponding aggregated metadata (e.g., catalogs, indexes, titles, metadata of content, etc.) which are searchable by users. A content service, responsive to queries received from the user, may use search, selection, and recommendation systems that filter, identify, and present content titles that are potentially of interest to users. User satisfaction with the search experience depends on the relevance of the results returned, as well as the time and effort involved in formulating a query.

BRIEF DESCRIPTION OF THE DRAWINGS

FIG. 1 is a diagram illustrating an exemplary environment in which exemplary embodiments of a natural language-based content system with corrective feedback and training service may be implemented;

FIG. 2A is a block diagram illustrating exemplary components and process of an exemplary embodiment of a feedback and trainer device depicted in FIG. 1;

FIG. 4 is a diagram illustrating exemplary components of a device that may correspond to one or more of the devices illustrated and described herein;

DETAILED DESCRIPTION OF PREFERRED EMBODIMENTS

Figure 2B:
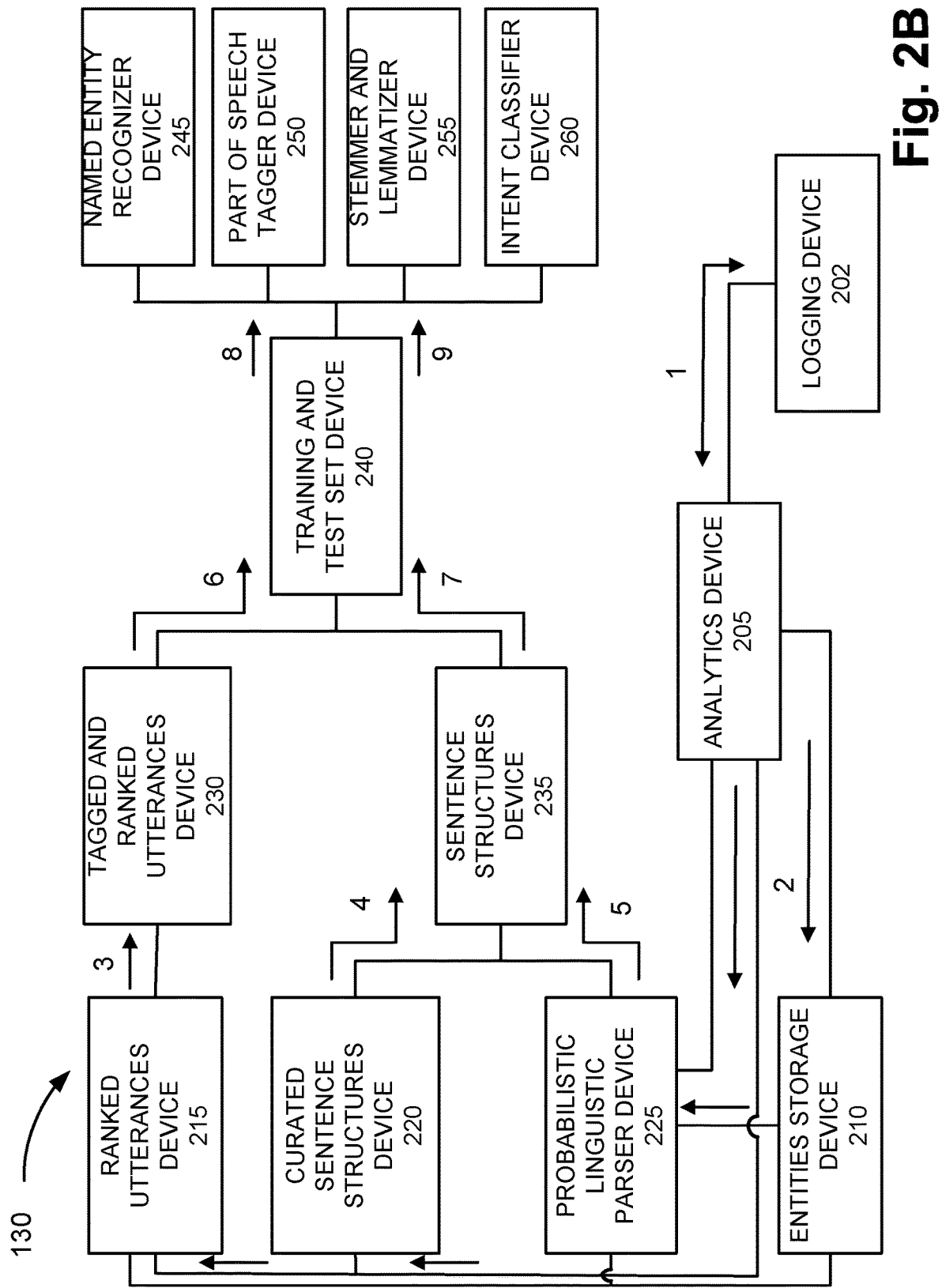
FIG. 2B is a block diagram illustrating an exemplary component of an exemplary embodiment of a content search and discovery device depicted in FIG. 1.

The following detailed description refers to the accompanying drawings. The same reference numbers in different drawings may identify the same or similar elements. Also, the following detailed description does not limit the invention.

Users are subjected to the time-consuming task of sifting through an ever-expanding collection of contents (e.g., video, audio, audio and video, text, web pages, movies, television programs, books, etc.) that is available for consumption from content providers. Intelligent content search and discovery technology—designed to search and return available content responsive to user queries—has not kept pace with advances in content generation/delivery capabilities.

The amount of user natural language data collected to provide statistical-based learning and generate accurate tags for contents is limited. While a system may collect natural language data of a user, there are technical challenges to be able to discern the user's intention and/or the contents to which the user's natural language data is directed. Indeed, the relationship between the user's vocal utterances and the search result is indirect because of the user's underlying intent. Also, behavioral cues provided by the user, which may be subtle, may be difficult to ascertain yet can provide feedback about the user's intent and/or the relevance of a search result.

Consequently, existing content search and discovery systems may unnecessarily expend network resources by generating less-than-optimal search results for users. Further, network resources may be also unproductively used to present undesirable content to the users, which may result in extended browsing sessions and lower user content-selection rates. Accordingly, the individual user experience would be improved, and the consumption of content generally increased, by more efficiently-performing search and discovery of content based on natural language voice input.

According to exemplary embodiments, a natural language-based content system with corrective feedback and training service is described. According to an exemplary embodiment, the natural language-based content system with corrective feedback and training service generates training samples based on feedback data to update and train natural language understanding logic of a content system. For example, the natural language understanding logic may interpret search queries from users and generate natural language understanding queries. According to an exemplary embodiment, the natural language-based content system with corrective feedback and training service generates feedback data to update search and discovery logic of the content system. For example, the search and discovery logic may search, discover, recommend, and personalize contents offered to users based on the natural language understanding queries, and navigate and control within a content service that offers the contents.

According to an exemplary embodiment, the training samples are generated based on a distribution function. According to an exemplary embodiment, the distribution function selects query objects to interpret a search query for the contents based on frequency of use of a query object by users. According to an exemplary embodiment, the selection of query objects by the distribution function may be modified based on various factors. For example, the various factors may include recency, popularity, and/or trends. According to an exemplary embodiment, the query object types include an intent type and an entity type, as described herein.

According to an exemplary embodiment, the training of the natural language understanding logic may be based on statistical and linguistic data. According to an exemplary embodiment, the multi-interpretative framework includes multiple parsings of the search query from a user based on a probabilistic grammar parser, a parts of speech component, and query object type identification that are configured for the contents domain. The multi-interpretative framework may further include stemming and/or lemmatizing the search query.

According to an exemplary embodiment, the natural language-based content system with corrective feedback and training service generates logging data based on the user's interaction with a search result. The natural language-based content system with corrective feedback and training service may analyze the logging data and generate feedback data. According to an exemplary embodiment, the content system may use the feedback data as a basis for modifying the natural language understanding interpretation of subsequently received search queries, and the search, discovery, and presentment of content items in subsequently presented search results.

According to an exemplary embodiment, the natural language-based content system with corrective feedback and training service may identify categories of user interaction data based on analysis of the logging data that is collected during a search session. For example, categories of user interaction may include refinement or generalization of a search query relative to a previous search query, as described herein. According to an exemplary embodiment, the feedback data may include data indicating a success or a failure of the search result based on an analysis of the logging data. The feedback data may also include performance metric data, probability values, frequency of use for words, phrases, sentences and other utterances included in search queries, and other types of data, as described herein.

In view of the foregoing, the natural language-based content system with corrective feedback and training service, as described herein, improves the content offering experience by condensing a content collection according to prescribed functions to feature content of prime interest to a user. For example, the natural language-based content system with corrective feedback and training service searches, identifies, and presents content items that represent the top content items responsive to natural language voice input from a user. Consequently, network resources that are used to generate the content offerings may be reduced relative to existing content search and discovery systems. For example, the natural language-based content system with corrective feedback and training service may reduce overall content search times, reduce utilization of processing resources (e.g., processor, memory, etc.), reduce user effort and time involvement required to reach the intended content, and present select content items to a user for consideration and selection more efficiently and/or accurately over time than existing search and discovery systems, thereby improving the user experience and minimizing network resource usage.

FIG. 1 is a diagram illustrating an exemplary environment 100 in which an exemplary embodiment of the natural language-based content system with corrective feedback and training service may be implemented. As illustrated, environment 100 includes a content network 105 and a network 140. Content network 105 may include a content catalog device 110, a content search and discovery device 115, a user management device 120, and a feedback and trainer device 130. According to other embodiments, environment 100 may include additional networks, fewer networks, and/or different types of networks than those illustrated and described herein. Environment 100 also includes an end device 150 that may be operated by a user 160.

The number and arrangement of network devices in content network 105, and the number of end devices 150 are exemplary. According to other embodiments, environment 100 may include additional devices, fewer devices, and/or differently arranged devices, than those illustrated in FIG. 1. For example, a single device in FIG. 1 may be implemented as multiple devices and/or multiple devices may be implemented as a single device. By way of further example, content search and discovery device 115 and feedback and trainer device 130 may be implemented as a single device. Additionally, or alternatively, for example, content search and discovery device 115 may be implemented as multiple devices.

A network device may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, a cloud device, a virtualized function, etc). The number and the type of network devices illustrated and described in environment 100 are exemplary.

Environment 100 includes communication links between the networks and communication links between the network devices. Environment 100 may be implemented to include wired, optical, and/or wireless communication links among the devices and the networks illustrated. A communicative connection via a communication link may be direct or indirect. For example, an indirect communicative connection may involve an intermediary device and/or an intermediary network not illustrated in FIG. 1. The number and the arrangement of communication links illustrated in environment 100 are exemplary.

Content network 105 includes a network that provides access to and use of a content service. Generally, content network 105 may be implemented as a satellite-based network, a terrestrial-based network, or a combination thereof. For example, content network 105 may be implemented to distribute content using various technologies, such as an optical architecture, a coaxial cable architecture, an Internet Protocol (IP) TV architecture, a digital subscriber line (DSL) architecture, a wireless architecture, a streaming architecture, a cloud architecture, a virtual network architecture, a multi-edge computing (MEC) network, and/or an Internet-based architecture. Depending on the architecture implemented, content network 105 may include various types of network devices that contribute to the access and use of the content service by users. For example, the content service may allow users to view various contents. The content service may support various methods of consumption of content, such as streaming, downloading, etc.

According to an exemplary embodiment, content network 105 includes network devices that provide the natural language-based content system with corrective feedback and training service, as described herein. According to an exemplary embodiment, the natural language-based content system with corrective feedback and training service is provided based on content search and discovery device 115 and feedback and trainer device 130.

Content catalog device 110 includes a network device that stores and manages cataloged metadata of content. According to an exemplary embodiment, the content may be audio and visual content, such as, for example, movies, television programs, network broadcasts, video-on-demand (VOD) content, premium channel content, and/or other types of audio and visual content. According to other exemplary embodiments, content may include audio content, such as, for example, music, books, podcasts, etc., and/or other forms of content (e.g., text, multimedia, etc.). Content catalog device 110 may include a mass storage device. Content catalog device 110 may include logic that provides various storage-related functions, such as, add, delete, update, etc., relating to the metadata. Content catalog device 110 may include logic that performs a query process. For example, content catalog device 110 may receive a query request from content search and discovery device 115, generate a query response, and transmit the response to content search and discovery device 115. According to other exemplary embodiments, content catalog device 110 may not include logic that performs the query process.

The metadata may include, for example, data indicating a title of a content, a genre and/or a sub-genre of the content, cast and crew information, storyline information (e.g., plot summary, synopsis, tagline, etc.), a movie rating or a television rating (e.g., R, PG-13, TV 14, etc.), a date of release, a language, a runtime, a video format (e.g., 8K, 4K, HD, 3D, etc.), an audio format (e.g., stereo, Dolby Surround 7.1, etc.), filming location information, recording location information, company credit information (e.g., production company, distributor, etc.), rating (e.g., user, critic, etc.), review (e.g., user, critic, etc.) and/or other information that pertains to the content (e.g., an image, a video trailer, a web site address, an audio book sample, biographies, links to other related content, deleted/behind the scenes content, etc.). In one embodiment, the metadata may include associated cost information (e.g., price, free, rent, buy, etc.) for the content. According to other exemplary embodiments, content catalog device 110 may store the metadata in various types of data structures (e.g., a tree structure, a graph, a neural network, etc.) and/or other type of information storage entity (e.g., a database).

Content search and discovery device 115 includes a network device that provides search and discovery services for content based on the natural language-based content system with corrective feedback and training service. According to an exemplary embodiment, content search and discovery device 115 may provide search and discovery services for content based on identification of query object types included in a search query from a user. According to an exemplary embodiment, the query object types include intent types and entity types. Examples of intent types may include a word or a phrase, such as search, play, like this, navigate, control, find, or other types of words or phrases that relate to the user's intent (e.g., a user command, etc.). Examples of entity types may include a word or a phrase, such as a person (e.g., an actor's name, cast, crew, or other person's name or portion thereof), a title of a content (e.g., a title of a movie, a show, a game, or other type of content), a type of content (e.g., a movie, a game, a show, music, or other content type), a topic (e.g., a theme, a character name, a time period, a setting, or other characteristic pertaining to the content), a team (e.g., a sports team name, etc.), a league (e.g., NBA, MLB, or other sports league), a channel (e.g., a channel name, a channel number, or another channel identifier), an application (e.g., a content provider, an application name, a widget, etc.), Boolean operators (e.g., and, or, not), a modifier (e.g., latest, popular, award-winning, top-rated, trending, or other types of descriptors of a content), and genre (e.g., drama, action, comedy, or another type of genre or sub-genre). These examples are not intended as an exhaustive list of such types but merely illustrative. Accordingly, other words or phrases not specifically mentioned herein may be representative of an intent type or an entity type. According to other exemplary embodiments, query objects may be characterized and/or categorized into types, other than or in addition to, intent types and/or entity types.

According to an exemplary embodiment, content search and discovery device 115 may provide the search and discovery services for content based on a natural language understanding model. The natural language understanding model may be trained and subject to the corrective feedback and training service, as described herein. The natural language understanding model may identify relevant content items, responsive to a search query for a content item from a user, based on statistical and linguistic data. For example, the natural language model may include a multi-interpretative framework that includes multiple parsings of the search query based on a probabilistic grammar parser, a parts of speech component, and query object type identification that are configured for the contents domain. The multi-interpretative framework may further include a stemmer and lemmatizer that stems and lemmatizes query objects included in the search query. As described herein, a search query or a search string may include a single character (e.g., a letter, a numeral, a special character, etc.), a single term of multiple characters (e.g., a word, etc.), and/or multiple terms (e.g., a phrase, a sentence, etc.).

According to an exemplary embodiment, the search and discovery services may also include a logging service. The logging service includes obtaining and storing search service information. For example, the search service information may include the user's search query, a search query generated by the natural language understanding model, and the search results generated by content search and discovery device 115. The search service information may also include data indicating the user's interaction with the search result. For example, the interaction data may indicate a content item selected from the search result by the user, a ranking of the content item selected (e.g., presented on a first page, a second page, etc., of the search results; the first content item presented, the second content item presented, etc., of the search results; etc.), that no content item was selected, that the search query was modified, how the search query was modified (e.g., refinement of the search query, generalization of the search query, adds or removes modifiers, words, phrases, etc., to/from the search query, repositioning of words, phrases, etc.), the search session was exited, the user consumed the selected content item, the user browsed metadata of the selected content item, and/or other types of user interaction data (e.g., navigation of the user (e.g., via the graphical user interface), time period viewing the search result, etc.). According to an exemplary embodiment, the logging service may be configured with a time window during which search service information may be obtained and stored.

According to an exemplary embodiment, content search and discovery device 115 includes logic that provides a user interface (e.g., an interactive graphical user interface) for users. For example, the user interface may display (e.g., text) stemming from a voice input of a user or other type of input (e.g., written text input, etc.) and the results of a search for content. According to other exemplary embodiments, content search and discovery device 115 may not provide the user interface, and another network device of the content service (not illustrated) may provide the user interface.

According to an exemplary embodiment, content search and discovery device 115 may use client-side media consumption logs for performing a search, selecting content items, and ranking the content items. Additionally, for example, content search and discovery device 115 may use historical search data indicating a measure of how many times a particular content item has been selected by users after a search; a quantifiable "popularity" factor for each content item that corresponds to overall user views of each content item; a quantifiable "quality" factor for each content item that may be derived from ratings reviews, critic reviews, etc., as well as other relevance modifiers, such as a quantifiable "recency" factor for each content item, which reflects a general loss of user interest in a content item after its initial availability; a quantifiable "cyclicity" or "seasonality" factor for each content item with respect to the time-of-day, day-of-week, week-of-the-month, week-of-the-year, month-of-the-year, etc. associated with a user's search query; a quantifiable "similarity" of one content item to another; and/or a relative cost to the user for consumption of a content item.

Referring to FIG. 2A, an exemplary embodiment of content search and discovery device 115 may include a natural language understanding (NLU)-based searcher with relevance logic 200 and a logging device 202.

NLU-based searcher with relevance logic 200 may include logic that receives search queries from the natural language understanding logic or model, searches and identifies content items based on natural language understanding search queries, and provides search results to the users. NLU-based searcher with relevance logic 200 includes logic to associate search strings to cataloged content items from a content collection, based on both personalized and non-personalized factors for correlating content to search terms.

NLU-based searcher with relevance logic 200 may receive feedback data, as described herein, and may modify the search and discovery service for content items based on the feedback data. For example, NLU-based searcher and relevance logic 200 may use the feedback data to further train a relevance algorithm that selects content items of a search result based on the search query. The feedback data may include various types of data, as described herein, such as user interaction data, performance metric data, scoring data, success and failure data, and counters data that may influence the selection and ranking of content items provided to the user.

According to an exemplary embodiment, a content item may have a relevancy score. The relevancy score may be a pre-computed value that correlates to the content. NLU-based searcher with relevance logic 200 may use one or multiple scores (or sub-scores) pertaining to relevancy. For example, a popularity score (mod=sqrt, boost=10), an auto-suggest score (mod=log 10, boost=100), a recency score (e.g., release_date (mod=Gaussian_decay, boost=2)), etc., may be applied during a content selection procedure and/or content ranking procedure.

According to an exemplary embodiment, a user interface of content search and discovery device 115 allows a user to submit multiple search queries within a same search session. This may occur, for example, if the user deems the search result is too narrow or generalized, or the user is dissatisfied with the current search result. According to such circumstances, content search and discovery device 115 may generate a new natural language understanding search query, perform another search, retrieve content items, and/or rank the content items, in whole or in part.

Logging device 202 may include a network device that collects and stores logging data during a search session. The search session may include receiving a search query from the user (e.g., vocalized, textual, etc.), the generation of a natural language understanding query based on the search query, the search and discovery of a content item, the presentation of a search result that includes the content item, and various types of user interaction responsive to the search result, such as the user selecting a content item for viewing, the user terminating the search session without selecting a content item, or the user modifying the search query and requesting another search within the time window constituting a user search session.

The logging data may include search service information. For example, the search service information may include a textual representation of the user's search query (e.g., vocalized query converted to text), a search query generated by the multi-interpretative natural language understanding model, and a search result generated by the natural language understanding search and discovery service. The search service information may include user interaction data, as described herein. For example, the user interaction data indicates various types of interaction by the user responsive to the search result, such as whether the user selected a content item from the search result or not, the ranking of the content item selected in the search result, whether or not the user modified the search query, and if so, how the search query was modified, navigational data (e.g., scrolling, page up, page down, accessing various types of metadata associated with a content item, etc.), and other actions performed by the user until the search session is terminated. As described herein, the search service information may be used to generate feedback data for the natural language-based content system with corrective feedback and training service. According to various exemplary embodiments, logging device 202 may obtain search service information based on a push method and/or a pull method with content search and discovery device 115 and various components thereof (e.g., user interface, an automatic speech recognition (ASR) engine that converts user speech to text, etc.).

User management device 120 includes a network device that stores user profile information pertaining to users of the content service. For example, the user profile information may include historical information pertaining to the user, such as information pertaining to previous search results (e.g., candidate offerings and/or forms of user input tracking), and content selected and/or consumed (client-side logs). The user profile information may also include user account information that may indicate a user account for accessing the content service. Additionally, for example, the user profile information may include demographic information of the user, a user identifier associated with the user, and end device information. For example, the user may set various parameter values pertaining to the content service and/or indicate a preference among content genres, viewing patterns, habits, or trends.

Feedback and trainer device 130 includes a network device that provides the natural language-based content system with corrective feedback and training service. Referring to FIG. 2B, according to an exemplary embodiment, feedback and trainer device 130 may include an analytics device 205, an entities storage device 210, a ranked utterances device 215, a curated sentence structures device 220, a probabilistic linguistic parser device 225, a tagged and ranked utterances device 230, sentence structures device 230, a training and test set device 240, a named entity recognizer device 245, a part of speech tagger device 250, a stemmer and lemmatizer device 255, and an intent classifier device 260. Other configurations may be implemented. For example, according to some exemplary embodiments, analytics device 205 may be omitted, and various components of feedback and trainer device 130 may communicate with logging device 202, obtain logging data, analyze the logging data, and generate one or multiple types of feedback data. Therefore, feedback and trainer device 130 may include additional, fewer, and/or different components than those depicted in FIG. 2B and described herein. The connections and process flows, as described herein, are exemplary. The functions described in connection with FIG. 2B may be performed based on a component of a device 400 illustrated in FIG. 4, and described herein. Various components of feedback and trainer device 130 may include logic that provides various storage-related functions, such as add, delete, and update data.

Analytics device 205 may include logic that analyzes logging data, and generates various types of feedback data based on the analysis of the logging data. Analytics device 205 may provide the feedback data to various devices of feedback and trainer device 130 and content search and discovery device 115, as described herein. According to still other exemplary embodiments, one or multiple types of feedback data may be generated by analytics device 205 and remaining types of feedback data may be generated by a component of feedback and trainer device 130.

According to an exemplary embodiment, analytics device 205 may analyze the logging data that includes search service information stemming from users of the content service. Analytics device 205 may generate feedback data and store the feedback data in entities storage device 210. For example, analytics device 205 may calculate frequency of use values pertaining to query objects. By way of further example, analytics device 205 may count the number of times "Tom Hanks" appeared in a search query during a configurable time period. Additionally, for example, analytics device 205 may calculate probability values pertaining to query objects, as described herein. For example, analytics device 205 may calculate the number of times "Tom Hanks" appeared in a search query relative to all search queries that occurred during the configurable time period. In addition, analytics device 205 may count the number of times "Tom Hanks" was used with "by" or "starring" versus "Tom Hanks" being used with "directed by" and the associated probabilities relative to all search queries. Also, when a user queries "Schwarzenegger movies" and later specializes the query to "Schwarzenegger Action movies" analytics device 205 may use the counts and associated probabilities to determine that users might prefer action movies of Schwarzenegger to other genre movies by the same actor and hence use that as an input to the relevance ranking of results even when a user queries "Schwarzenegger movies".

According to an exemplary embodiment, analytics device 205 may analyze the logging data that includes search service information. Analytics device 205 may identify and rank search query terms (e.g., a word, a phrase, a symbol, etc.) used by users to search for a content item. According to an exemplary implementation, analytics device 205 may identify the top k search query terms used by users. The value of k may be a configurable numerical value. For example, analytics device 205 may count the number of times a search query term (e.g., an actor, a movie title, etc.) is used in search queries during a configurable time period. Analytics device 205 may rank the counted search query terms, and select the top k search query terms based on such ranking. Analytics device 205 may provide feedback data (e.g., the ranked search query terms) to ranked utterances device 215.

According to an exemplary embodiment, analytics device 205 may analyze the logging data that includes search service information. Analytics device 205 may calculate probabilistic values and/or correlated data based on the logging data. For example, the probability values may pertain to query objects and grammar interpretations. Analytics device 205 may provide feedback data to probabilistic linguistic parser device 225.

According to an exemplary embodiment, analytics device 205 may analyze the logging data, generate feedback data, and provide the feedback data to NLU-based searcher with relevance logic 200 and/or other components of feedback and trainer device 130. For example, the feedback data may include performance metric data, success and failure data, and counters data, as described herein.

Performance metric data may include data indicating a performance value pertaining to the searches and/or search results. These performance metrics may be used to measure the performance of the system as well as to create objective functions that may be used to train some of the relevance and other search algorithms. For example, analytics device 205 may calculate an average number of distinct searches (ADS) value among users. An ADS value may be calculated as the total number of distinct searches/total number of search sessions. In this regard, the higher the ADS value the higher degree of user dissatisfaction or difficulty in reaching the desired content item. According to another example, analytics device 205 may calculate a successful search ratio (SSR) value among users. For example, the SSR value may be calculated as the number of sessions where the user selected results/total number of search sessions. In this regard, the higher the value of the SSR value, the greater user satisfaction and relevance of content items of the search results. According to yet another example, analytics device 205 may calculate a refined search ratio (RSR) value. For example, the RSR may be calculated as the number of modified search queries (e.g., adding a modifier to an otherwise similar and previous search query during the same search session)/total number of search sessions. In this regard, the higher the value of the RSR, the greater degree of training may be needed for the search and relevance algorithm.

According to still another example, analytics device 205 may calculate an average score to equalize rank (AER) value that indicate a score to take a selected content item to the top ranked content items in which AER (i, u)=Average (score of selected content item for that utterance, score of top ranked content item for that utterance). Analytics device 205 may calculate a mean average score to equalize rank (MEAR). In this regard, if the mean AER value gets lower over time, the relevance of discovered content items is improving.

Historical user selection data may be used to generate an "autosuggest" score for a search string (e.g., a word, a phrase, etc.). For example, when a user searches a term "u" (e.g., u being a word, a phrase, or other type of string) and then selects a content item "i" from the search results, an auto-suggest score may be calculated based on a function A(i, u), such that the output is a measure of how many times users have selected content item, i, after searching for the term u. When A(i,u) reaches a threshold value based on searches conducted and correlation between the search term and selection of the content, a final auto-suggest score, A', may be calculated. According to an exemplary implementation, the final auto-suggest may be calculated according to the exemplary equation, $$A'(i,u)=\log_{10}(\max(A(i,u),10)) \quad (1)$$

Other formulations are possible to generate a value in the range of 1-10, for example, or within some other configurable range of values. Alternatively, a second auto-suggest score may be calculated based on the AER value according to the exemplary equation, $$A''(i,u)=A'(i,u)+\text{AER}(i,u) \quad (2)$$

Analytics device 205 may calculate other types of feedback based on the success or failure of the search query, the search result, and user interaction data stemming from the search query and/or search result. For example, analytics device 205 may identify search results as a success (S) when a content item is selected from the user, and the content item is ranked among the top content items in the search result (e.g., within top w content items). Analytics device 205 may also identify search results as a failure (F) when no content item is selected during the search session. For example, the user may exit the search session. Analytics device 205 may also identify that a search query was invalid (V) when the user repeats the same utterances (e.g., actor, title, or other type of query object), which could mean the failure of a speech recognition system in disambiguating the previous speech into the correct natural language utterance or the presence of homonyms. For example, an ASR engine that converts user speech to text may need modification (e.g., select an alternate ASR result) and/or use alternate utterances from search results to determine if the user utterance was misunderstood. Analytics device 205 may also identify other success or failure types, such as a relevance failure (R) in which the search results may not be what the user expected or the content items were not ranked in an order expected by the user. For example, the user may repeat utterances with different or additional modifiers (e.g., recent, popular, top, best, award-winning, etc.). According to another example, the user may navigate to a second page of the search results to select a lower ranked content item.

Analytics device 205 may identify a natural language understanding failure (Q), such as when an entity was misunderstood (e.g., a user repeats the same query objects during the search session), a user wanted more specific results (e.g., a user adds additional entities or modifiers to the search query during the search session), a user wanted a different logical operation (e.g., a user uses a different boolean word or places the boolean in a different location), a user utterance was misunderstood in terms of intent (e.g., a user repeats action words with different combinations, without changing entity types), a user utterance was misunderstood in terms of the entities (e.g., a user repeats a sentence structure with entity order replaced, or qualifiers for entities (e.g., actor Tom Hanks), entity categories were misunderstood (e.g., a user repeats the sentences with entity names the same but with category names added or disambiguating (e.g., "cowboys" to "cowboys team" or "Dallas cowboys"), or a user is setting a context or refining (e.g., a user uses a top level topic entity (e.g., Tom Hanks, etc.) or uses certain narrowing words (e.g., only).

Analytics device 205 may also identify an availability or access failure (A), such as when a content item is not in a lookup content catalog or the user doesn't have access rights to the content item.

Analytics device 205 may also identify certain types of user interaction data pertaining to the modification of a search query subsequent to the presentment of a search result. For example, according to an exemplary embodiment, the modification may be categorized as a generalization or a refinement. Typically, a modification that is generalizing may be considered broadening, while a modification that is refining may be considered narrowing. Additionally, the modification may be full or partial. For example, analytics device 205 may determine whether the modification is a full generalization (FG), a partial generalization (PG), a full refinement (FR), or a partial refinement (PR) based on various criteria indicated in the user interaction data. According to an exemplary embodiment, the criteria for a given modification may include use of certain words or phrases by the user to modify the search query, the removal and/or addition of certain words or phrase relative to the search query, and/or the types of modifications (e.g., repositioning of words or phrases, etc.).

Analytics device 205 may identify a full generalization when the user is presented with a search result and within a configurable time window, the user, for example, removes a modifier from the search query, adds an "or" condition to the search query, or adds more generic concepts (e.g., a team name to a league name), and requests another search using the modified search query. Analytics device 205 may identify a partial generalization when the user is presented with a search result and within a configurable time window, the user, for example, adds a term, such as "also", "plus", etc., or adds a content provider name, an application name, or a widget identifier to the search with the intent to widen the search, and requests another search using the modified search query.

Analytics device 205 may identify a full refinement when the user is presented with a search result and within a configurable time window, the user may, for example, add and/or replace modifiers, categories, reposition entities, and/or modify boolean/logical entities that tend to narrow the search space. Additionally, for example, analytics device 205 may identify a partial refinement when the user is presented with a search result and within a configurable time window, the user, for example, sets a context using entity category names or using phrases, such as "is a" or other types of limiting words or phrases, and requests another search using the modified search query. The criteria described in relation to the full generalization, the partial generalization, the full refinement, and the partial refinement are exemplary.

According to an exemplary embodiment, analytics device 205 may tabulate, such as using a counter mechanism, to keep track of the number and type of success and failure types (e.g., S, F, V, R, Q, A) and modifications (e.g., FG, PG, FR, and PR). The values associated with these types of feedback data may be used by the natural language-based content system with corrective feedback and training service.

Entities storage device 210 may include a network device that stores query objects used by the natural language-based content system with corrective feedback and training service. For example, as previously described, the query objects may include intent types and entity types. Entities storage device 210 may also store correlated data relative to the query objects. According to an exemplary embodiment, the correlated data may include statistical data. For example, the statistical data may include data indicating a frequency of use by users of an entity type value (e.g., a particular title of a movie, etc.) or an intent type value (e.g., search, find, etc.) during a time period. Additionally, the frequency of use may correlate to other types of frequency of use values. For example, the frequency of use of a particular title of the movie may yield a frequency of use value pertaining to the genre of the movie, an actor starring in the movie, and/or other metadata of the content item pertaining to the title of the movie.

According to another example, the statistical data may include a probability value (e.g., frequency of use of an entity type value or intent type value relative to other entity or intent type values of the same entity or intent type) during a time period. For example, the probability value may indicate a value indicating a frequency of use by users of a particular title of a movie relative to other movie titles. The probability values may be used to generate sample utterances for training and disambiguation.

According to various exemplary embodiments, the statistical data may be stored on a per-user basis, a user group basis (e.g., users having common demographics, of the same locale, etc.), and/or other configurable sets. For example, for a per-user basis, the utterance "cowboy" may be assigned a probability value of 0.69 for meaning a topic versus a probability value of 0.31 for meaning a football team. According to some exemplary embodiments, entities storage device 210 may include analytics that generates the feedback data based on the logging data of logging device 202. According to other exemplary embodiments, entities storage device 210 may obtain the feedback data from analytics device 205, or a portion thereof. Entities storage device 210 includes logic that uses the feedback data to provide the corrective feedback and training service, as described herein. For example, entities storage device 210 may update probability values or other types of correlated data based on the feedback data.

Ranked utterances device 215 may include a network device that stores ranked query objects based on their frequency of use by users. For example, ranked utterances device 215 may store the top k query objects in various categories of the entity types and the top k query objects for the intent types, as described herein. For example, ranked utterances device 215 may store the top k person (e.g., an actor's name, cast, crew, or other person's name or portion thereof), a title of a content (e.g., a title of a movie, a show, a game, or other type of content), a type of content (e.g., a movie, a game, a show, music, or other content type), a topic (e.g., a theme, a character name, a time period, a setting, or other characteristic pertaining to the content), a team (e.g., a sports team name, etc.), and so forth. Additionally, for example, ranked utterances device 215 may store the top k user commands (e.g., search, find, navigate, etc.) or other types of user intent, as described herein. According to some exemplary embodiments, ranked utterances device 215 may include analytics that generates the feedback data based on the logging data of logging device 202. According to other exemplary embodiments, ranked utterances device 215 may obtain the feedback data from analytics device 205, or a portion thereof. Ranked utterances device 215 includes logic that uses the feedback data to provide the corrective feedback and training service, as described herein. For example, ranked utterances device 215 may update the ranking of query objects based on the feedback data.

Curated sentence structures device 220 may include a network device that stores curated words, phrases, symbols, sentences, and other potential utterances from users. For example, the curation may be performed by a person (e.g., network personnel, administrator, etc.) and may be used to supplement a set of sentence structures and query objects output from probabilistic linguistic parser device 225. According to some exemplary embodiments, curated sentence structures device 220 may include analytics that generates the feedback data based on the logging data of logging device 202 and/or the feedback data may be provided via human intervention. According to other exemplary embodiments, curated sentence structures device 220 may obtain the feedback data from analytics device 205, or a portion thereof. Curated sentence structures device 220 includes logic that uses the feedback data to provide the corrective feedback and training service, as described herein. For example, curated sentence structures device 220 may update the stored curation with new words, phrases, etc., associated with user verbiage or content items based on the feedback data. Curated sentence structures device 220 may also blacklist certain sentence structures or entity name-to-entity type mappings. Additionally, for example, curated sentence structures device 220 may override one sentence structure or entity type mapping (e.g., "Godfather" as a title) over another fewer used mapping (e.g., "Godfather" as a character name).

Probabilistic linguistic parser device 225 may include probabilistic grammar parser logic. For example, probabilistic linguistic parser device 225 may include a probability context-free grammar (PCFG) parser that parses the search query of a user. According to another example, probabilistic linguistic parser device 225 may use another type of parser (e.g., a weighted CFG (WCFG)). Probabilistic linguistic parser device 225 may use lookup tables or other type of information entity that correlates probabilities to the parsing of the received input. Probabilistic linguistic parser device 225 may identify the entities, categories, and modifiers based on the output from the PCFG parser, and generate a unified natural language understanding (NLU) query. For example, for a text input of "find Tom Hanks courtroom drama or thrillers not R rated," the PCFG parser may parse the text input as:

```
(S (SAP find))
(PE Tom Hanks)
(TO courtroom)
(OR or (GG dramas)(GG thrillers))
(NOT not (RT r)))
```

A legend for SAP, PE, etc., is provided below.

Additionally, for example, the NLU query may be represented as:

```
("intent":"search",
    "query": ("bool": "and", "filters" : (
        ("person": ("values": ("Tom Hanks"))),
        ("genre": ("bool": "or", "values": ("action", "adventure"))),
        ("topic": ("values":("courtroom"))),
        ("rating":("bool": "not", "values":("R")))
    ))
)
```

According to another example, for a text input of "show movies like Frozen", the NLU query may be represented as:

```
("intent": "more like this",
"query":("bool": "and", "filters": (
    ("title": ("values" : ("Frozen")))
)
```

Probabilistic linguistic parser device 225 includes grammar rules for text relating to content search queries using a linguistic method. In contrast to using a deep learning method based on a set of samples, probabilistic linguistic parser device 225 uses the grammar to generate the samples, but also uses the grammar as a validation for text in a given search query structure. Probabilistic linguistic parser device 225 may also resolve disambiguation among different interpretations of the text based on an assigned probability of an interpretation associated with a query object relative to another assigned probability of another interpretation associated with the query object. Additionally, or alternatively, probabilistic linguistic parser device 225 may identify multiple interpretations or iterations of production for a query object and probability values. Probabilistic linguistic parser device 225 may update probabilities and/or interpretations associated with grammar productions based on feedback information from other components of the content service. For example, probabilistic linguistic parser device 225 may obtain feedback information (e.g., query object interpretations, probability values, etc.) from analytics device 205 that may be used as a basis for machine learning by probabilistic linguistic parser device 225.

An exemplary embodiment of the grammar rules of a CFG are set forth below in a Backus-Naur Form (BNF) with the probabilities not illustrated:

```
TitleSearchPCFGStr = """""
S -> TAP TMOD TTI TMT
S -> TAP TMOD TPE2 TTO2 TMT
S -> TAP TMOD TMT TTO2X
S -> TAP TMOD TMT TPE2X
S -> TAP TMOD TTM2 TSMT
S -> TAP TMOD TTL TSMT
TMOD -> "<START:mod>" MOD "<END>"
TMOD ->
TTI -> "<START:title>" TI "<END>"
TPE2 -> TPE | TPE "and" TPE | TPE TPE |
TPE2X -> TPEQ TPE | TPEQ TPE "and" TPE | TPEQ TPE TPE |
TTO2 -> TTO | TTO "and" TTO | TTO TTO |
TTO2X -> TTOQ TTO | TTOQ TTO "and" TTO | TTOQ TTO TTO |
TTM2 -> TTM | TTM "versus" TTM | TTM "against" TTM | TTM "and" TTM |
TTOQ -> "<START:not>" WITHOUT "<END>" | WITH
TPEQ -> "<START:not>" NOTBY "<END>" | BY
NOT -> "not"
NOTBY -> "not by" | "without actor" | "not with" | "not starring"
BY -> "by" | "of" | "with actor" | "starring" | "with"
WITH -> "about" | "with" | "containing"
WITHOUT -> "without" | "not with" | "not about"
TTO -> "<START:topic>" TO "<END>"
TPE -> "<START:person>" PE "<END>"
TTM -> "<START:team>" TM "<END>"
TTL -> "<START:league>" TL "<END>"
TMT -> "<START:media>" MT "<END>"
TMT ->
TSMT -> "<START:media>" SMT "<END>"
TSMT ->
TAP -> "<START:search>" AP "<END>"
TAP ->
MOD -> "top" | "best" | "popular" | "recent" | "latest" | "newest"
MT -> "movie" | "on tv" | "series" | "shows" | "movies" | "show"
SMT -> "games" | "game" | "match" | "matches" | "tournament" |"tournaments"
AP -> "show me" | "search for" | "search" | "get me" | "find me" | "go to" | "find all"
"""""
```

Terminals may be loaded into lookup tables from databases with associated probabilities.

TI→loadShowAndMovieTitles ( )
PE→loadPeople ( )
TO→loadTopics ( )
TM→loadTeamNames ( )
TL→loadLeagueNames ( )

Legend:
S: Starting point for Search Action
TAP: Tagged action phrase
TMOD: Tagged modifier
TT: Tagged title
TMT: Tagged media type
TSMT: Tagged sports media type
TPE2: Tagged people phrase with up to 2 people
TPE2X: Tagged people phrase with inclusion modifiers
TTO2: Tagged topic phrase with up to two topics
TTO2X: Tagged topic phrase with inclusion modifiers
TTM2: Tagged team phrase with up to 2 teams
TTOQ: Tagged inclusion modifier for topics (e.g., with/without)
TPEQ: Tagged inclusion modifier for people (e.g., by/not by)
TTO: Tagged topic phrase
TPE: Tagged person phrase
TTM: Tagged team phrase
TTL: Tagged league phrase
MOD: Modifier—List of modifier terminals
ML: MediaType—List of mediatype terminals
SMT: SportSMediaType—List of sports mediatype terminals
AP: Action phrase—List of action phrase terminals
NOT: List of terminals meaning "not"
NOTBY: List of terminals meaning "not by/with a person"
BY: List of terminals meaning "by/with a person"
WITH: List of terminals meaning "with or containing"
WITHOUT: List of terminals meaning "without or not containing"
TT: Show Title (Movie or Series)
PE: Person
TO: Topic
TM: TeamName
TL: LeagueName As an example, consider a search query string of "find Tom Hanks courtroom dramas or thriller movies without R ratings." Probabilistic linguistic parser device 225 may yield the following exemplary results:

TABLE 1

| Word | Entity | Normalized Value | Probability value |
|---|---|---|---|
| Find | Action phrase | Search | 0.8 |
| Tom Hanks | Person | Tom Hanks | 0.9 |
| Courtroom | Topic | Courtroom | 0.9 |
| Courtroom | Title | Courtroom | 0.0 |
| Dramas | Genre | Drama | 0.3 |
| Or | Boolean | Or | 0.9 |
| Thriller | Genre | Thriller | 0.4 |
| Movies | Media Type | Movie | 0.9 |
| Without | Boolean | Not | 0.9 |
| R | Person | R | 0.0 |
| R | Rating | R | 0.9 |
| Ratings | Category | Rating | 0.9 |

As illustrated in Table 1, each word of the query search string may be assigned an entity type, a normalized value, and a probability value. In cases where the lookup yields no match, the probability value may be 0 (e.g., for "R" as a person, probability value is 0).

According to some exemplary embodiments, probabilistic linguistic parser device 225 may include analytics that generates the feedback data based on the logging data of logging device 202. According to other exemplary embodiments, probabilistic linguistic parser device 225 may obtain the feedback data from analytics device 205, or a portion thereof. Probabilistic linguistic parser device 225 includes logic that uses the feedback data to provide the corrective feedback and training service, as described herein. For example, probabilistic linguistic parser device 225 may update probability values and/or other correlated data based on the feedback data. Probabilistic linguistic parser device 225 may identify and update relevant terminal entities (also known as terminal symbols that are lexical elements used in specifying the production rules of formal grammar) based on the feedback data. For example, a user might say "Action movie" as an input for a search query, and the system may consider "Action" as the title of a 1999 movie. The user may refine the search by saying "Action movies" and the system may search for "Action" as a genre, and generate a list of movies. The user may choose one of them and the system may count this as a successful search, and a score for genre "Action" may be incremented among genres. As a result, "Action" may be mapped as a "genre" a greater number of times than as a "title" and hence for this sentence structure, the probability of "Action" being a genre is increased and the probability of "Action" being a title is lowered.

Tagged and ranked utterances device 230 may include a network device that receives an output from ranked utterances device 215. Tagged and ranked utterances device 230 may store an assignment of query objects to the ranked utterances (e.g., words, phrases, sentences, etc.). According to some exemplary embodiments, the assignment of query objects and/or candidate search queries may be performed manually.

Sentence structures device 235 may include a network device that receives an output from curated sentence structures device 220 and probabilistic linguistic parser device 225. Sentence structures device 235 may include logic that assigns query objects to various sentence structures and candidate search queries. For example, a search query of "search for recent Matrix movies" may yield <search> search for </search> <mod> recent> <title> Matrix </title> <media> movies </media>.

Training and test set device 240 may include a network device that receives an output from tagged and ranked utterances device 230 and sentence structures device 235. Training and test set device 240 may select and designate some samples from the output to be used to train the NLU model, and other samples to be used to test the trained NLU model. Training and test set device 240 may perform training and test procedures in relation to named entity recognizer device 245, part of speech tagger device 250, stemmer and lemmatizer device 255, and intent classifier device 260.

Named entity recognizer device 245 may include logic that infers named entities in the text. For example, named entity recognizer device 245 may include a trained named entity model that is able to generalize novel or obscure entities. For example, for a query search of "movies acted by Jackie Chan," named entity recognizer device 245 may tag "Jackie Chan" as a person even though the training samples of the named entity model may not specifically include "Jackie Chan." Named entity recognizer device 245 may not flag a sentence structure.

Named entity recognizer device 245 may provide an output based on the intent and entity types, as described herein. For example, for a query search, such as "what was the Tom Cruise courtroom drama?", named entity recognizer device 245 may provide an output, such as: {intent: ["search"] and entities {person: ["Tom Cruise"], genre: ["action", "adventure"], topic: ["courtroom"]}.

Part of speech tagger device 250 may include logic that generates the parts-of-speech of a query. For example, part of speech tagger device 250 may include a model that splits a text string into different sub-sentence structures or fragments, such as a verb, a noun, an adjective, an adverb, a conjunction, a preposition, a pronoun, singular, plural, a gerund, possessive, and other types of syntactic and morphological structures (e.g., a prefix, a suffix, a Boolean operator, etc.). Part of speech tagger device 250 may perform other operations, such as disambiguation, medial capitalization to extract names, etc. For example, a query search such as "find Tom Hanks courtroom dramas or thrillers not R rated," part of speech tagger device 250 may provide the following exemplary output: (S (VP find (SBAR (S (NP Tom Hanks) (NP (NP courtroom dramas) or (NP (NP thrillers) not (SBAR (S (NP R)(VP rated)))))))))). For example, VP indicates verb phrase and NP indicates noun phrase. According to this example, "courtroom" and "dramas" are and'ed and then or'ed with "thrillers."

Stemmer and lemmatizer device 255 may include logic that uses stemming techniques to reduce each word of a query to its primitive form. Stemmer and lemmatizer device 255 may be trained with root forms in a given catalog. For example, in standard English, the word "rate" may be the root word for the word "rating", but in a content or media domain, the word "rating" may be the root word. As an example of an output, stemmer and lemmatizer device 255 may receive a query search, such as "find Tom Hanks courtroom dramas or thriller movies without R ratings," and output "find Tom Hanks courtroom drama or thriller movie without R rating." Stemmer and lemmatizer device 255 may manage both inflectional variance and derivational variance, may consider context, may identify the dictionary form of a word (e.g., a lemma), and may identify the stem of a word (e.g., which may or may not have a dictionary meaning), and so forth. Additionally, for example, stemmer and lemmatizer device 255 may include logic to forego a word or phrase reduction for keywords that may be included in the metadata of content which are useful from an interpretative standpoint of the vocalized search query of the user. For example, a query search, such as "light-hearted movie", stemmer and lemmatizer device 255 may include an output "light-hearted movie." In this regard, for example, "light-hearted" may not be stemmed or word reduced to "light-heart".

Intent classifier device 260 may include a network device that identifies the user's action associated with the search query. For example, intent classifier device 260 may identify various types of intent types of the query objects included in the search query. By way of further example, intent classifier device 260 may identify various user commands directed to searching for contents (e.g., search, find, look for, etc.) or other types of user commands (e.g., navigational, etc.).

As previously described, FIG. 2B illustrates an exemplary process of an exemplary embodiment of a corrective feedback and training service. For example, in step (1), analytics device 205 may obtain logging data from logging device 202. In step (2), analytics device 205 may generate feedback data based on an analysis of the logging data, and provide the feedback data to entities storage device 210, ranked utterances device 215, curated sentence structures device 220, and probabilistic linguistic parser device 225, as described herein. In step (3), ranked utterances device 215 may update stored data based on the feedback data, and provide an output to tagged and ranked utterances device 230. In steps (4) and (5), curated sentence structures device 220 and probabilistic linguistic parser device 225 may update stored data based on the feedback data, and provide outputs to sentence structures device 235. In steps (6) and (7), based on the outputs from devices 215, 220, and 225, tagged and ranked utterances device 230 and sentence structures device 235 may update stored data based on the feedback data, and provide outputs to training and test set device 240. In steps (8) and (9), training and test set device 240 may use the received input data as a basis for executing training and testing procedures relative to named entity recognizer device 245, part of speech tagger device 250, stemmer and lemmatizer device 255, and intent classifier device 260.

Referring back to FIG. 1, although not illustrated, content network 105 may include other types of network devices that provide various content services, such as a content processing device (e.g., transcoding, encryption, machine learning, etc.), a digital rights management device, a licensing device, a login device (e.g., authentication, authorization, etc.), a billing device, and a content server device.

Network 140 includes one or multiple networks of one or multiple types. For example, network 140 may be implemented to include a terrestrial network, a content delivery network, a wireless network, a wired network, an optical network, a radio access network, a core network, a packet network, an Internet Protocol (IP) network, the Internet, the World Wide Web, a private network, a public network, a television distribution network, a streaming network, a mobile network, and/or other type of network that provides access to content network 105.

End device 150 includes a device that has computational and communication capabilities. The communication capabilities of end device 150 may include wireless, optical, and/or wired communication. End device 150 may be implemented as a mobile device, a portable device, or a stationary device. By way of further example, end device 150 may be implemented as a smartphone, a personal digital assistant, a tablet, a netbook, a phablet, a wearable device, a set-top box, an infotainment system in a vehicle, a smart television, a game system, a music playing system, a computer (e.g., a desktop, a laptop, a palmtop, etc.), or some other type of end device (e.g., a remote control with voice input, etc.). End device 150 may include one or multiple devices, such as a main device, or the main device and a peripheral device. According to various exemplary embodiments, end device 150 may be configured to execute various types of software (e.g., applications, programs, etc.). The number and the types of software may vary among end devices 150. According to an exemplary embodiment, end device 150 includes software that provides access to and/or use of the content service, which includes the natural language-based content system with corrective feedback and training service, as described herein. For example, the software may be implemented as a browser, a mobile application, or other type of client application. End device 150 may include a microphone that captures voice input from a user 160. User 160 may be a person that operates end device 150.

Figure 3:
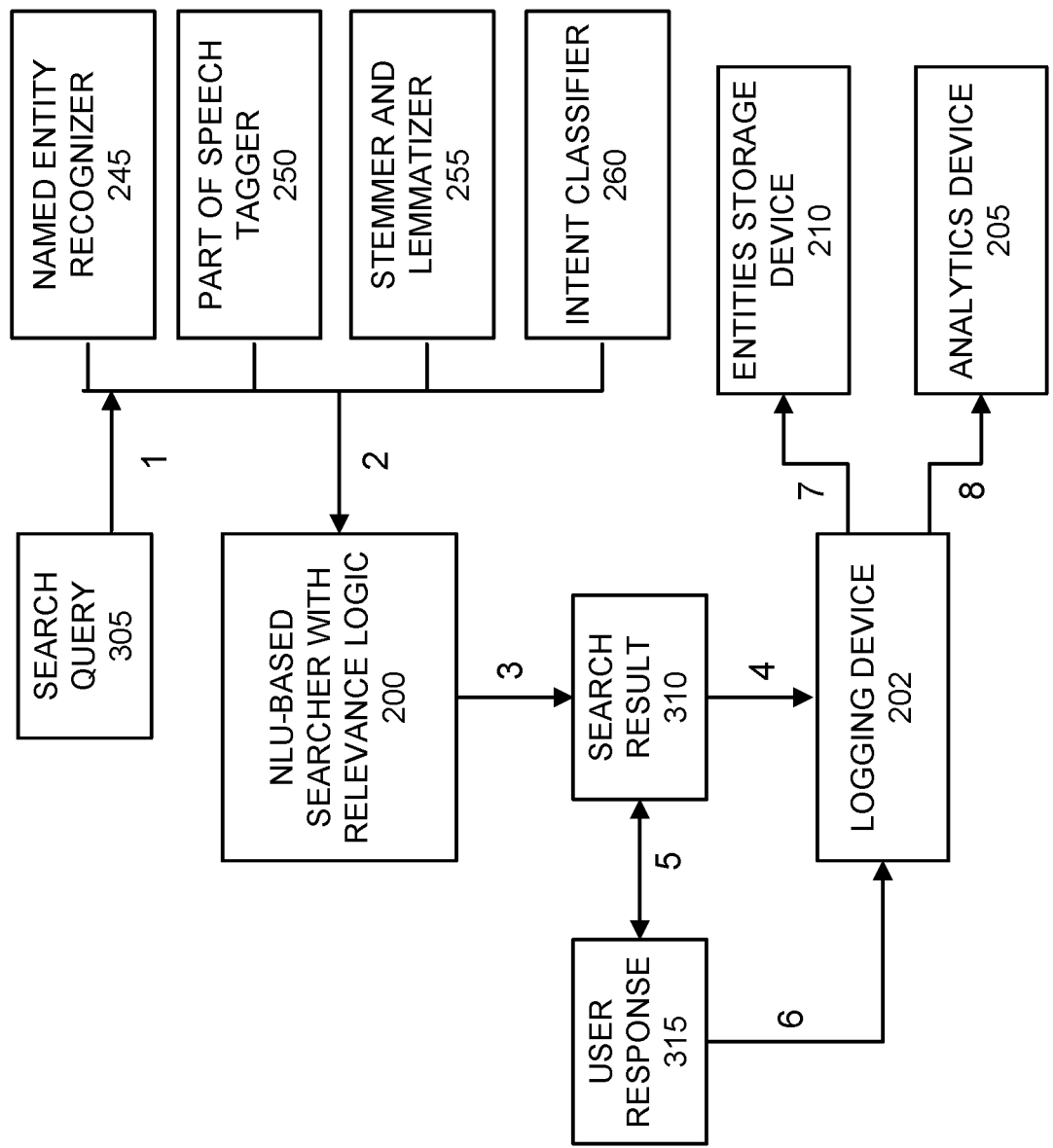
FIG. 3 is a block diagram illustrating an exemplary process of an exemplary embodiment of the corrective feedback and training service.

FIG. 3 is a block diagram illustrating an exemplary process of an exemplary embodiment of the corrective feedback and training service. For example, in step (1), a search query 305 from a user may be received by devices 245, 250, 255, and 260. In step (2), the search query may be processed into a NLU query and output to NLU-based searcher with relevance logic 200. In step (3), NLU-based searcher with relevance logic 200 may search and discover content items based on the NLU query, and generate a search result 310. In step (4), logging device 202 may obtain search service information, such as the search query 305, the NLU query, and the search result. In step (5), the user may provide a user response 315 relative to the presented search result 310, and in step (6), logging device 202 may obtain user interaction data. In steps (7) and (8), feedback data may be generated and used in support of the corrective feedback and training service. For example, in step (7), according to an exemplary embodiment, entities storage device 210 may analyze the logging data, generate feedback data, and update the data stored by entities storage device 210 based on the feedback data. Similarly, although not illustrated in FIG. 3, but previously described in FIG. 2B and elsewhere, other devices of feedback and trainer device 130 may generate feedback data and update based on the logging data. According to another exemplary embodiment, in step (8), analytics device 205 may generate all or some of the feedback data, and various devices of feedback and trainer device 130 may update.

The corrective feedback and training service may be iteratively performed. Additionally, for example, the corrective feedback and training service may be performed based on a configured time window (e.g., every few months or another shorter or longer time period) or other parameters (e.g., threshold values associated with search failure rates, performance metric values, etc.).

FIG. 4 is a diagram illustrating exemplary components of a device 400 that may be included in one or more of the devices described herein. For example, device 400 may correspond to components included in network devices of content network 105 and/or end device 150. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to network devices of content network 105, software 420 may include an application that, when executed by processor 410, provides the functions of the natural language-based content system with corrective feedback and training service, as described herein. Software 420 may also include firmware, middleware, microcode, hardware description language (HDL), and/or other form of instruction. Software 420 may be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., centralized, distributed, etc.) and according to various network architectures (e.g., a virtualized function, a server, a client, etc.). Device 400 may be implemented in the same manner. For example, as a virtualized function, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a public/private cloud or other type of network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5A:
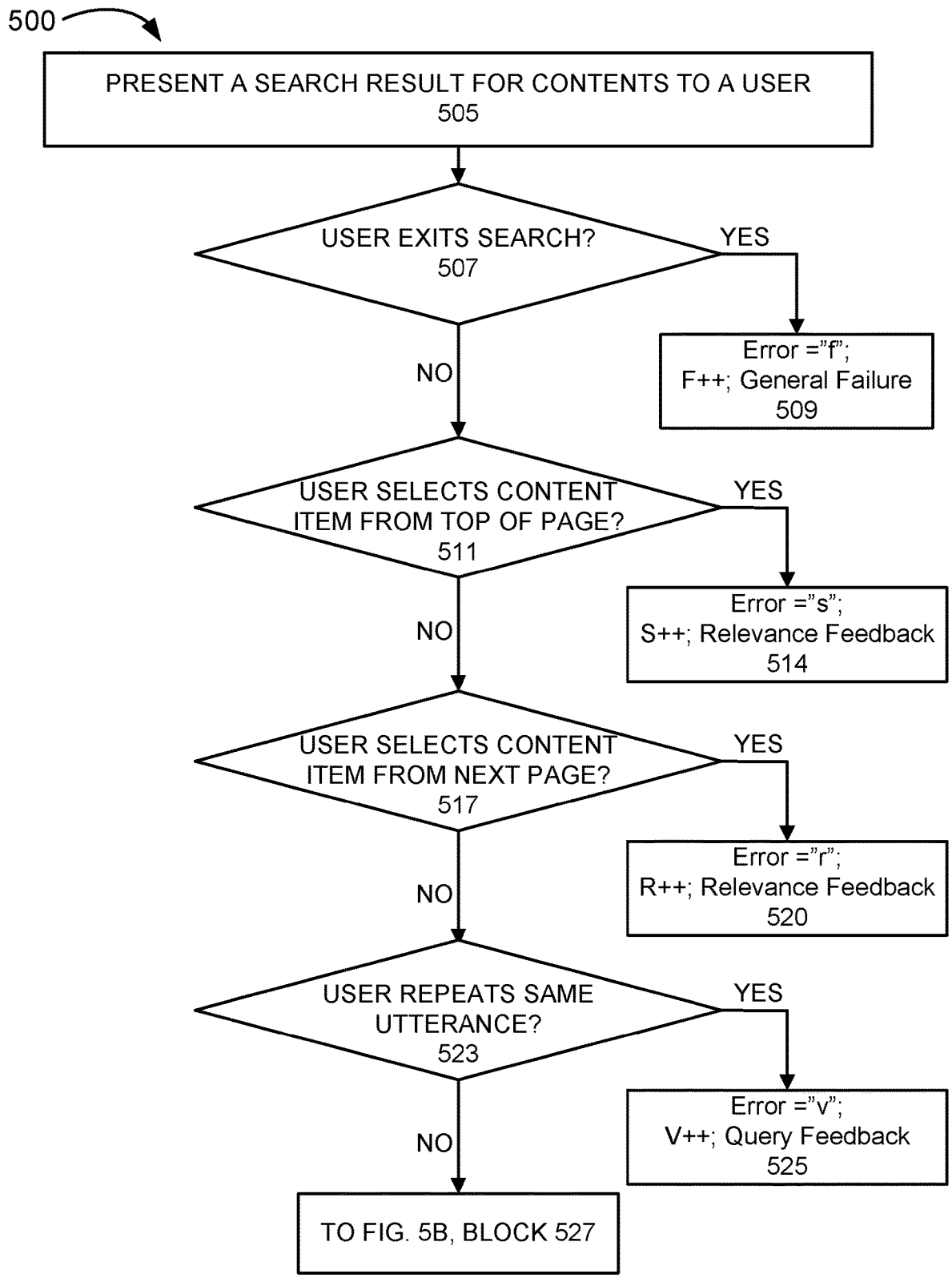
FIGS. 5A and 5B are flow diagrams illustrating an exemplary process of an exemplary embodiment of the natural language-based content system with corrective feedback and training service.
Figure 5B:
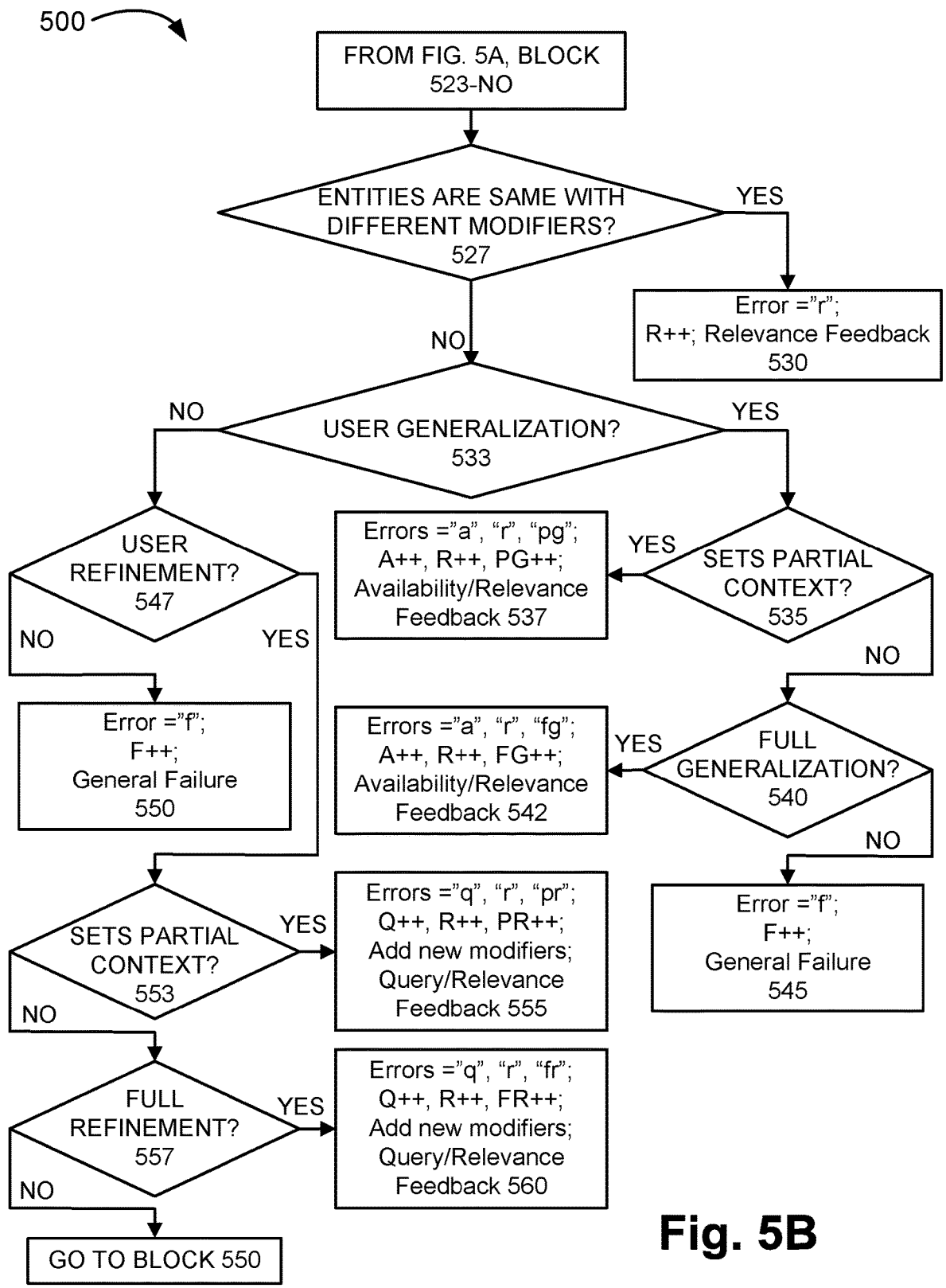

FIGS. 5A and 5B are flow diagrams illustrating an exemplary process 500 of an exemplary embodiment of the natural language-based content system with corrective feedback and training service. According to an exemplary embodiment, a network device (e.g., feedback and trainer device 130) performs steps of process 500. For example, processor 410 executes software 420 to perform the steps illustrated in FIGS. 5A and 5B and described herein.

According to an exemplary process 500 shown in FIGS. 5A and 5B, user 160 associated with end device 150 may have an account for the content service of content network 105. User 160 may access the content service via end device 150.

Referring to FIG. 5A, in block 505, a search result for contents may be presented to the user. For example, user 160 may provide a search query to content search and discovery device 115 for contents, and content search and discovery device 115 may perform a search and provide a search result including one or multiple content items to user 160 via end device 150. During a configurable time period of the search session, various types of user interaction data may be stored in logging device 202, as described herein. According to an exemplary embodiment, analytics device 205 may analyze the logging data (e.g., which includes the user interaction data), and generates feedback data to be used by the corrective feedback and training service.

In block 507, it may be determined whether the user exits the search session. For example, if user 160 exited the search session without selecting a content item for viewing (e.g., streaming or downloading) (block 507—YES), analytics device 205 may generate feedback data that indicates a general failure (F) (block 509). For example, analytics device 205 may increment a numerical value (e.g., F++) for counting the determined instance of general failure (F) (block 509). If the user doesn't exit the search session (block 507—NO), it may be determined whether the user selected a content item from a top of a page of a search result (block 511). For example, if user 160 selects a content item from the top of a first page that includes ranked content items (block 511—YES), analytics device 205 may generate feedback data that indicates a success (S) (block 514). For example, analytics device 205 may increment a numerical value (e.g., S++) for counting the determined instance of success (S) (block 514). As illustrated, the feedback data may be directed to relevance logic of content items selected and ranked pertaining to the search and discovery service of content search and discovery device 115.

If the user doesn't select a content item from the top of the page (block 511—NO), it may be determined whether the user selects a content item from a next page of the search result (block 517). For example, if user 160 selects a content item from a second page or a page other than the first page (block 517—YES), analytics device 205 may generate feedback data that indicates a relevance error (R) (block 520). For example, analytics device 205 may increment a numerical value (e.g., R++) for counting the determined instance of relevance error (block 520). If the user doesn't select a content item from the second page or another page (block 517—NO), it may be determined whether the user repeated the same utterance (block 523). For example, if user 160 repeats the same search query, analytics device 205 may generate feedback data that indicates a voice ASR failure (V) (block 525). For example, analytics device 205 may increment a numerical value (e.g., V++) for counting the determined instance of voice ASR failure (block 525). If the user doesn't repeat the same utterance (block 523—NO), referring to FIG. 5B, it may be determined whether the entities in the search query are the same but include different modifiers (block 527). For example, if user 160 repeats the same entities in the search query but uses different modifiers, analytics device 205 may generate feedback data that indicates a relevance error (R) (block 530). For example, analytics device 205 may increment a numerical value (e.g., R++) for counting the determined instance of relevance error.

If the user doesn't use the same entities in a next search query (block 527—NO), it may be determined whether the user has generalized the search query (block 533). For example, if user 160 has broadened the search query (block 533—YES), analytics device 205 may determine whether the generalization of the search query is a partial generation (block 535). For example, if user 160 modifies the search query using certain words or adds a content provider name, an application name, or a widget identifier, analytics device 205 may determine that the search query is a partial generalization (block 535—YES). Analytics device 205 may generate feedback data that indicates an availability error (A), a relevance error (R), and a partial generalization (PG) (block 537). Analytics device 205 may increment numerical values (e.g., A++, R++, PG++) for counting the determined instances of error and search query modification (block 537).

If the search query is not a partial generalization (block 535—NO), it may be determined whether the user has provided a full generalization of the search query (block 540). For example, if user 160 has removed a modifier, used certain words, or used more generic concepts, analytics device 205 may determine that the search query is a full generalization (block 540—YES). Analytics device 205 may generate feedback data that indicates an availability error (A), a relevance error (R), and a full generalization (FG) (block 542). Analytics device 205 may increment numerical values (e.g., A++, R++, FG++) for counting the determined instances of error and search query modification (block 542).

If the search query is not a full generalization (block 540—NO), analytics device 205 may determine that a general failure (F) occurred (block 545). Analytics device 205 may increment a numerical value (e.g., F++) for counting the determined instance of a general error.

Referring back to block 533, if user 160 has not broadened the search query (block 533—YES), analytics device 205 may determine whether the user has refined the search query (block 547). For example, if user 160 has narrowed the search query (block 547—YES), analytics device 205 may determine whether the refinement of the search query is a partial refinement (block 553). Otherwise, analytics device 205 may determine that a general failure occurred (block 547—NO). Analytics device 205 may generate feedback data that indicates a general failure (F) and increment a numerical value (e.g., F++) for counting the determined instance of a general failure (block 550).

Referring to block 553, if user 160 modifies the search query using certain words or phrases, or sets a context, analytics device 205 may determine that the search query is a partial refinement (block 553—YES). Analytics device 205 may generate feedback data that indicates a natural language query understanding error (Q), a relevance error (R), and a partial refinement (PR) (block 555). Analytics device 205 may increment numerical values (e.g., Q++, R++, PR++) for counting the determined instances of error and search query modification (block 555).

If the search query is not a partial refinement (block 553—NO), it may be determined whether the user has provided a full refinement of the search query (block 557). For example, if user 160 has added or replaced a modifier, a category, a boolean, and/or another type of sentence structure, analytics device 205 may determine that that the search query is a full refinement (block 557—YES). Analytics device 205 may generate feedback data that indicates a natural language query understanding error (Q), a relevance error (R), and a full refinement (FR) (block 560). Analytics device 205 may increment numerical values (e.g., Q++, R++, PR++) for counting the determined instances of error and search query modification (block 560). Otherwise, analytics device 205 may determine that a general failure occurred (block 557—NO). Analytics device 205 may generate feedback data that indicates a general failure (F) and increment a numerical value (e.g., F++) for counting the determined instance of a general failure (block 550).

FIGS. 5A and 5B illustrates an exemplary process 500 of an exemplary embodiment of the natural language-based content system with corrective feedback and training service, according to other embodiments, process 500 may include additional operations, fewer operations, and/or different operations than those illustrated in FIGS. 5A and 5B, and described herein. Process 500 may be iteratively performed. Additionally, for example, process 500 may include a different order of determinations in relation to the user interactive data. Process 500 may end when user 160 exits the content service, selects content to view, purchase, or download, and/or other user input (or lack thereof) that indicates a search process has ended. As previously described, the feedback data, which includes the success and failure data and the counter data, may be used by the natural language-based content system with corrective feedback and training service. For example, as described herein, the feedback data may be used by feedback and trainer device 130 and/or content search and discovery device 115 (e.g., NLU-based searcher with relevance logic 200, ASR engine, etc.).

According to an exemplary embodiment, based on the modification of the search query, other types of feedback data may be collected and stored. For example, various sentence structures (e.g., words, phrases, modifiers, etc.) associated with the modified search query may be stored as feedback data. The feedback data may be used as a basis for modifying relevance learning logic used by content search and discovery device 115, and may be used to modify a probability value, a relevance value, a popularity value, and/or other types of factors associated with the value for an entity type on a per user basis and/or other type of user group basis. Additionally, the feedback data may be used as a basis for calculating performance metric data, training data, test data, etc.

Figure 6:
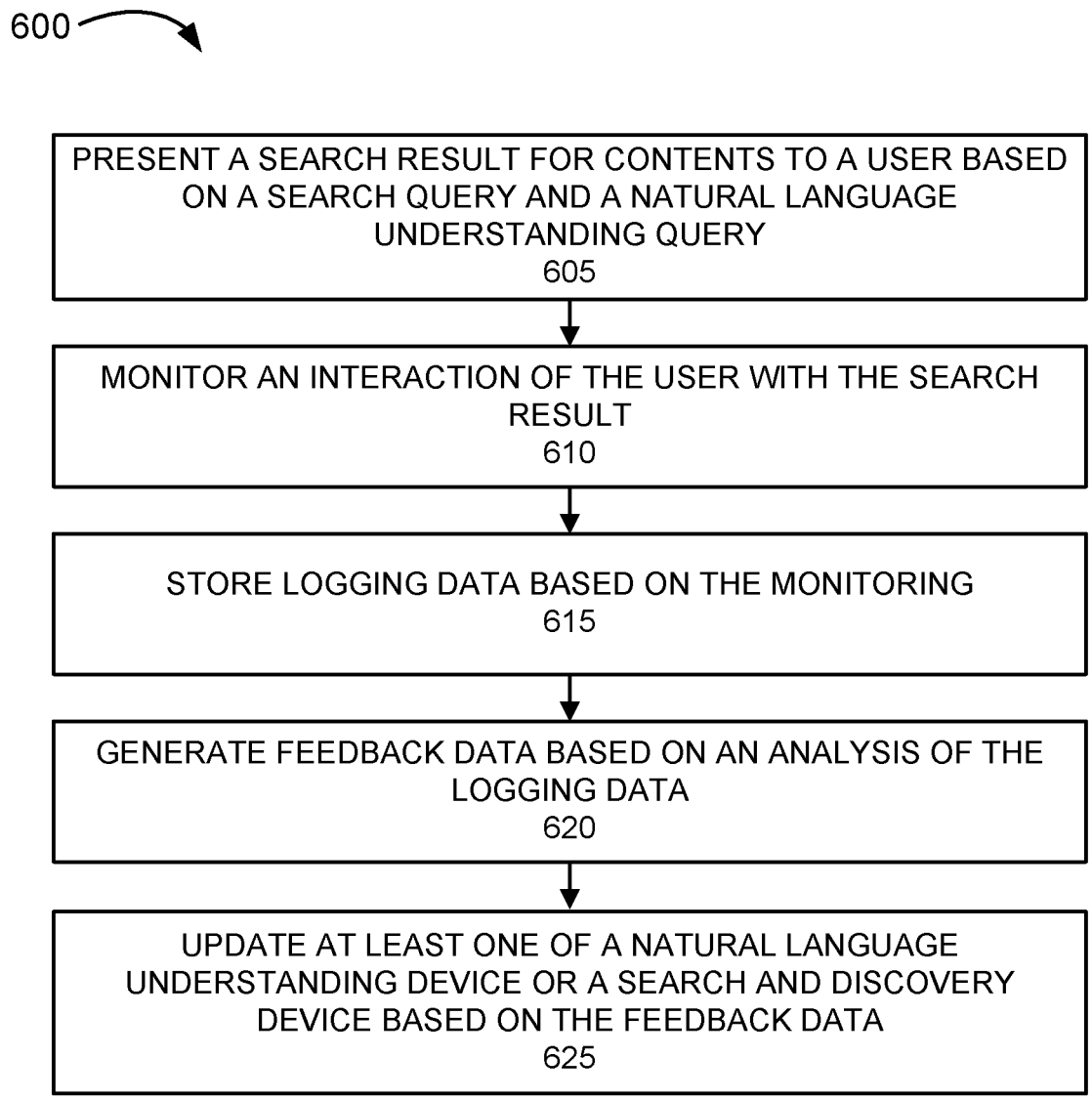
FIG. 6 is another flow diagram illustrating another exemplary process of an exemplary embodiment of the natural language-based content system with corrective feedback and training service.

FIG. 6 is another flow diagram illustrating another exemplary process of an exemplary embodiment of the natural language-based content system with corrective feedback and training service. According to an exemplary embodiment, a network device (e.g., content search and discovery device 115, feedback and trainer device 130) performs steps of process 600. For example, processor 410 executes software 420 to perform the steps illustrated in FIG. 6 and described herein.

Figure 7:
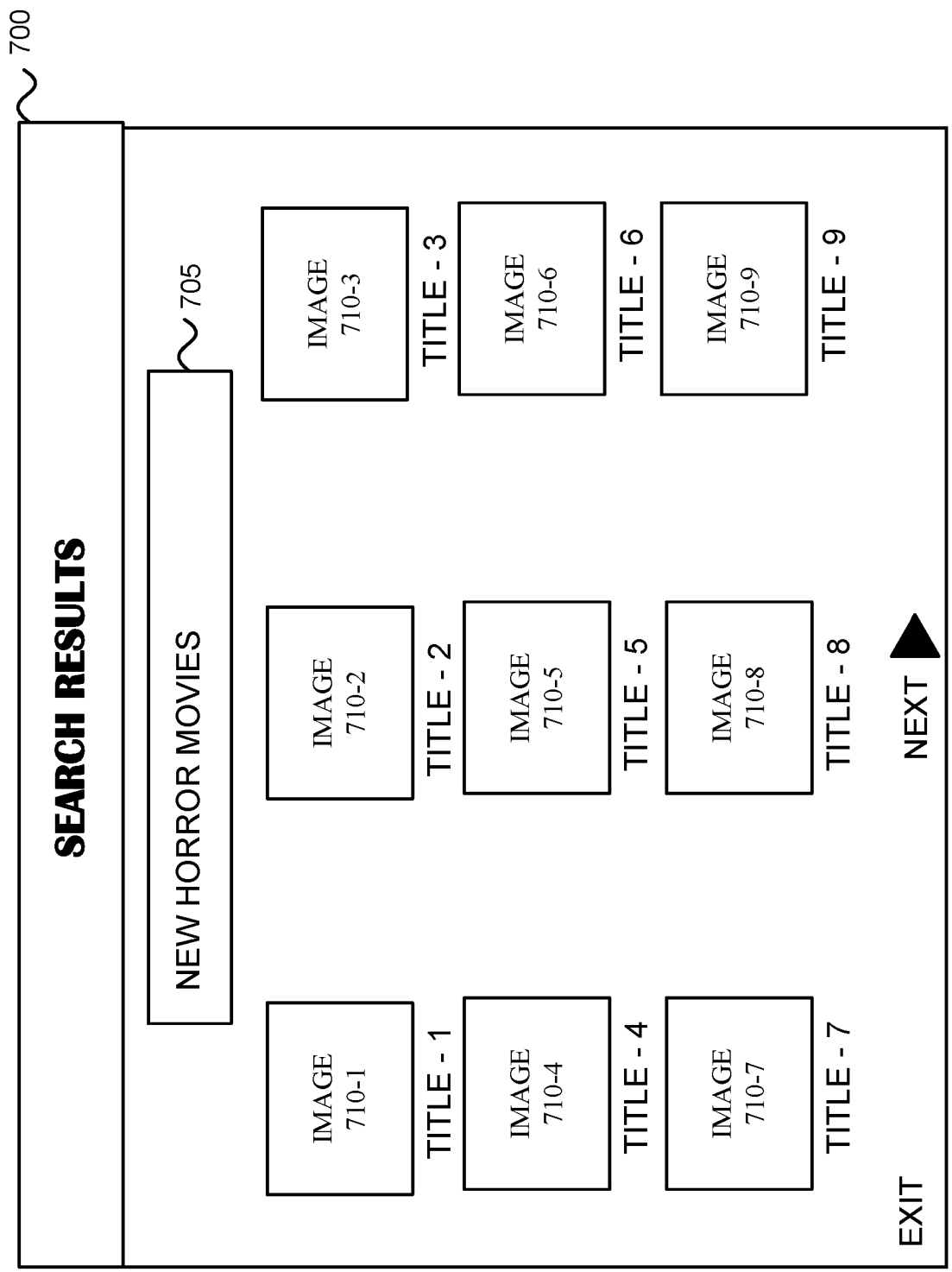
FIG. 7 is a diagram illustrating an exemplary user interface.

In block 605, a search result may be presented to a user based on a search query and a natural language understanding query. For example, content search and discovery device 115 may provide, via a user interface, a search result. By way of further example, referring to FIG. 7, a graphical user interface 700 may include a search field 705 that indicates the user's voice input, and the search results. According to this example, the search results include images 710-1 through 710-9 and titles 1-9 associated with the images 710. Images 710 may be images that represent the content items, such as a movie cover or poster, or other suitable image. According to other examples, user interface 700 may include additional, fewer, and/or different instances of information, arrangement, and/or elements. Content search and discovery device 115 may generate the search result based on a search query provided by the user and a natural language understanding query generated by a natural language understanding device (e.g., named entity recognizer device 245, part of speech tagger device 250, stemmer and lemmatizer device 255, intent classifier device 260).

In block 610, an interaction of the user with the search result may be monitored. For example, logging device 202 may monitor search service information, as previously described, in relation to graphical user interface 700.

In block 615, logging data may be stored based on the monitoring. For example, logging device 205 may store logging data based on the monitoring. Additionally, logging device 202 may also store logging data that includes the search query, the natural language understanding query, and the search result.

In block 620, feedback data may be generated based on an analysis of the logging data. For example, analytics device 205 and/or other devices (e.g., content search and discovery device 115, feedback and trainer device 130) may analyze the logging data. Analytics device 205 and/or other devices may generate feedback data based on the analysis of the logging data. For example, the feedback data may include identifying top k values of query objects, probability values, performance metric data, success and failure data, and counter data, as previously described.

In block 625, at least one of a natural language understanding device or a search and discovery device may be updated based on the feedback data. For example, feedback and trainer device 130 may update various components based on the feedback data, generate training and test samples, and re-train natural language understanding components that generate natural language understanding queries. Additionally, for example, content search and discovery device 115 may update relevance logic used to search, discovery, and/or rank content items.

FIG. 6 illustrates an exemplary process 600 of an exemplary embodiment of the natural language-based content system with corrective feedback and training service, according to other embodiments, process 600 may include additional operations, fewer operations, and/or different operations than those illustrated in FIG. 6, and described herein. Process 600 may be iteratively performed.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 5A, 5B, and 6, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420). The embodiments have been described without reference to the specific software code since the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415.

To the extent the aforementioned embodiments collect, store or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

All structural and functional equivalents to the elements of the various aspects set forth in this description that are known in the art or later come to be known in the art are expressly incorporated herein by reference and are intended to be encompassed by the claims.

What is claimed is:

1. A method comprising:
    presenting, by a network device, a search result for contents based on a first search query from a user;
    monitoring, by the network device in response to the presenting, an interaction of the user with the search result, wherein the interaction includes the user providing a second search query;
    analyzing, by the network device, the second search query;
    identifying, by the network device based on the analyzing and quaternary choices including a full generalization, a partial generalization, a full refinement, and a partial refinement, that the second search query is one of the full generalization, the partial generalization, the full refinement, or the partial refinement;
    generating, by the network device based on the identifying, feedback data indicating the interaction of the user; and
    updating, by the network device based on the feedback data, at least one of a natural language understanding device that interprets search queries from users based on query object types or a search and discovery device that searches and selects relevant content items for inclusion in search results.

2. The method of claim 1, wherein the generating of the feedback data further comprises:
    generating, by the network device, the feedback data that indicates the second search query is one of the full generalization, the partial generalization, the full refinement, or the partial refinement.

3. The method of claim 1, wherein the feedback data further indicates multiple categories of error in relation to the search result, wherein the multiple categories of error include a relevance category and a natural language understanding category.

4. The method of claim 1, wherein the feedback data includes the first search query, a natural language understanding query generated based on the first search query and the query object types, and the search result, and the method further comprising:
    storing, by the network device, information that correlates probability values to query object types, and wherein the updating comprises:
    updating, by the network device, one or more of the probability values based on the feedback data.

5. The method of claim 1, further comprising:
    generating, by the network device based on the feedback data, training data, and wherein the updating comprises:
    training, by the network device, the natural language understanding device based on the training data.

6. The method of claim 5, wherein the feedback data includes a set of words, phrases, and sentences provided by the users in the search queries that are ranked based on frequency of use.

7. The method of claim 1, wherein the feedback data includes performance metric data, the performance metric data including at least one of an average number of distinct searches value that indicates an average number of searches among search sessions of the users, or a successful search ratio value that indicates a number of searches of the users that content items from the search results are selected relative to a total number of the searches of the users.

8. The method of claim 1, wherein the contents include movies and television programs.

9. A network device comprising:
    a communication interface;
    a memory, wherein the memory stores instructions; and
    a processor, wherein the processor executes the instructions to:
    present a search result for contents based on a first search query from a user;
    monitor, in response to the presentment, an interaction of the user with the search result, wherein the interaction includes the user providing a second search query;
    analyze the second search query;
    identify, based on the analysis and quaternary choices including a full generalization, a partial generalization, a full refinement, and a partial refinement, that the second search query is one of the full generalization, the partial generalization, the full refinement, or the partial refinement;
    generate, based on the identification, feedback data indicating the interaction of the user; and
    update, based on the feedback data, at least one of a natural language understanding device that interprets search queries from users based on query object types or a search and discovery device that searches and selects relevant content items for inclusion in search results.

10. The network device of claim 9, wherein, when generating the feedback data, the processor further executes the instructions to:
    generate the feedback data that indicates the second search query is one of the full generalization, the partial generalization, the full refinement, or the partial refinement.

11. The network device of claim 10, wherein the feedback data further indicates multiple categories of error in relation to the search result, wherein the multiple categories of error include a relevance category and a natural language understanding category.

12. The network device of claim 9, wherein the feedback data includes the first search query, a natural language understanding query generated based on the first search query and the query object types, and the search result, and the processor further executes the instructions to:
store information that correlates probability values to query object types, and wherein, when updating, the processor further executes the instructions to:
update one or more of the probability values based on the feedback data.

13. The network device of claim 9, wherein the processor further executes the instructions to:
generate, based on the feedback data, training data, and wherein, when updating, the processor further executes the instructions to:
train the natural language understanding device based on the training data.

14. The network device of claim 13, wherein the feedback data includes a set of words, phrases, and sentences provided by the users in the search queries that are ranked based on frequency of use.

15. The network device of claim 9, wherein the feedback data includes performance metric data, the performance metric data including at least one of an average number of distinct searches value that indicates an average number of searches among search sessions of the users, or a successful search ratio value that indicates a number of searches of the users that content items from the search results are selected relative to a total number of the searches of the users.

16. The network device of claim 9, wherein the contents include movies and television programs.

17. A non-transitory computer-readable storage medium storing instructions executable by a processor of a device, which when executed, cause the device to:
present a search result for contents based on a first search query from a user;
monitor, in response to the presentment, an interaction of the user with the search result, wherein the interaction includes the user providing a second search query;
analyze the second search query;
identify, based on the analysis and quaternary choices including a full generalization, a partial generalization, a full refinement, and a partial refinement, that the second search query is one of the full generalization, the partial generalization, the full refinement, or the partial refinement;
generate, based on the identification, feedback data indicating the interaction of the user; and
update, based on the feedback data, at least one of a natural language understanding device that interprets search queries from users based on query object types or a search and discovery device that searches and selects relevant content items for inclusion in search results.

18. The non-transitory computer-readable storage medium of claim 17, wherein the instructions to generate the feedback data further comprise instructions, which when executed, cause the device to:
generate the feedback data that indicates the second search query is one of the full generalization, the partial generalization, the full refinement, or the partial refinement.

19. The non-transitory computer-readable storage medium of claim 18, wherein the feedback data further indicates multiple categories of error in relation to the search result, wherein the multiple categories of error include a relevance category and a natural language understanding category.

20. The non-transitory computer-readable storage medium of claim 17, wherein the instructions to generate further comprise instructions, which when executed, cause the device to:
generate, based on the feedback data, training data, and wherein the instructions to update further comprise instructions, which when executed, cause the device to:
train the natural language understanding device based on the training data.

* * * * *